United States Patent [19]

Komori et al.

[11] Patent Number: 5,128,388

[45] Date of Patent: Jul. 7, 1992

[54] HOT MELT ADHESIVE CROSSLINKABLE BY ULTRAVIOLET IRRADIATION, OPTICAL DISC USING THE SAME AND PROCESS FOR PREPARING THEREOF

[75] Inventors: Isamu Komori, Takatsuki; Satoshi Nishikawa, Shiga; Masao Shizuki, Toyonaka, all of Japan

[73] Assignee: Sunstar Giken Kabushiki Kaisha, Osaka, Japan

[21] Appl. No.: 277,347

[22] Filed: Nov. 29, 1988

[30] Foreign Application Priority Data

Nov. 30, 1987 [JP] Japan .................. 62-301679
Nov. 30, 1987 [JP] Japan .................. 62-301680

[51] Int. Cl.$^5$ .................. C08L 9/06; C08L 53/02; C08F 287/00
[52] U.S. Cl. .................. 522/95; 369/286; 428/462; 522/102; 522/110; 522/121; 525/98; 525/99
[58] Field of Search .................. 522/95, 102, 106, 110, 522/121; 525/98, 99

[56] References Cited
U.S. PATENT DOCUMENTS

| | | | |
|---|---|---|---|
| 4,253,899 | 3/1981 | Takemoto | 522/96 |
| 4,430,417 | 2/1984 | Heinz | 430/281 |
| 4,431,723 | 2/1984 | Proskow | 430/281 |
| 4,556,464 | 12/1985 | St. Clair | 522/110 |
| 4,574,142 | 3/1986 | Charnock | 525/305 |
| 4,857,434 | 8/1989 | Klingler | 522/122 |
| 4,948,825 | 8/1990 | Sasaki | 522/110 |

*Primary Examiner*—Marion E. McCamish
*Assistant Examiner*—Arthur H. Koeckert
*Attorney, Agent, or Firm*—Wegner, Cantor, Mueller & Player

[57] ABSTRACT

A hot melt adhesive crosslinkable by UV irradiation comprising a hot melt adhesive base, a saturated hydrocarbon oligomer containing at least one acryloyl group in a molecule for affording crosslinkability by UV irradiation, and a photopolymerization initiator, an optical disc comprising a pair of substrate, at least one of which is provided with an information recording layer, adhered to each other by means of a hot melt adhesive crosslinkable by UV irradiation and the process for preparing the same are disclosed. The adhesive of the present invention has a high heat resistance and heat stability, is applicable at a low temperature and at a low viscosity, has high softening point and high viscosity by UV irradiation. The optical disc of the present invention has high productivity, no corrosion and high heat resistance.

4 Claims, 1 Drawing Sheet

HOT MELT ADHESIVE CROSSLINKABLE BY ULTRAVIOLET IRRADIATION, OPTICAL DISC USING THE SAME AND PROCESS FOR PREPARING THEREOF

The present invention relates to a novel hot melt adhesive crosslinkable by ultraviolet (UV) irradiation, more particularly, a hot melt adhesive crosslinkable by ultraviolet irradiation prepared by blending a hot melt adhesive with a specific oligomer affording crosslinkability by ultraviolet irradiation and photopolymerization initiator, which is crosslinkable by ultraviolet irradiation to give an improved heat stability when applied. The present invention further relates to an optical disc and a process for preparing the same, more particularly, an optical disc comprising a pair of substrate which are adhered to each other by means of a specific hot melt adhesive crosslinkable by ultraviolet irradiation and the process for preparing the same.

TECHNICAL BACKGROUND AND PRIOR ART

Since a hot melt adhesive (hereinafter referred to as "HMA") is a non-solvent type adhesive and fast setting, it is widely employed in various fields. For example, in the field of the production of an optical disc, HMA is expected to be used in place of the conventional epoxy adhesive and solvent type adhesive due to its advantage such as easiness in handling.

There has hitherto been known, for example, HMA comprising a block thermoplastic elastomer, a tackifier and a softening agent wherein a softening point or a melt viscosity is regulated (see Japanese Patent First Publication "Kokai" No. 108044/1983). In application to a disc, it is desired to apply at as low temperature and low viscosity as possible so that the disc is not impaired. Under these conditions, however, a heat resistant property is limited. The HMA having a disadvantage of insufficient heat resistance as mentioned above, it is particularly difficult to keep a balance between an application property and a heat resistance property and the HMA is thus limited in an applicable range as an adhesive.

Under the above-mentioned circumstances, it has been attempted to improve a heat resistance of the HMA by blending it with a compound curable by irradiation of radiation (e.g. acrylate monomer, etc.), followed by irradiation of radiation to cure (see Japanese Patent First Publication "Kokai" No. 1086/1972, West Germany Offenlegungsschrift No.2350030). However, since the acrylate monomer easily provokes thermal polymerization with heating during blending or application, increased viscosity or gellation of the HMA frequently occurs. Therefore, it is necessary to carry out a series of blending and application procedures in a short period of time (see "Setchaku (adhesion)" Vol. 29, No. 6 (1985), pages 36–37).

An optical disc comprising a pair of substrates, which is provided with an optically readable information recording layer in at least one of the substrates, has been used as a video disc, a digital audio disc, or a disc for documents and data.

The optical disc is usually prepared by adhering a pair of substrates. For the adhesion of the pair of substrates, there have been used an epoxy adhesive, an urethane adhesive, an ultraviolet curable adhesive, a hot melt adhesive and the like. However, these adhesives have disadvantages, i.e. the epoxy adhesive has a low curing rate and the disadvantage of lower productivity. In case of the ultraviolet curable adhesive, the monomer component contained in the adhesive may corrode the substrate and the hot melt adhesive has low heat stability.

SUMMARY OF THE INVENTION

The present inventors have intensively studied as to an adhesive suitable for optical discs, particularly as to improvement of heat resistance by photo-curing and of heat stability when applied, and have found that the adhesive having the desired property can be produced by blending the HMA with a specific UV-crosslinkable oligomer and a photopolymerization initiator and that the adhesive can be cured and show desired properties by UV irradiation. Further, the present inventors have intensively studied as to an optical disc which has high productivity, no corrosion and high heat resistance and a process for preparation thereof, and have found that the desired optical disc can be prepared by applying a hot melt adhesive crosslinkable by UV irrradiation onto one of a pair of the substrates and irradiating with UV radiation.

An object of the present invention is to provide a hot melt adhesive crosslinkable by ultraviolet irradiation comprising a hot melt adhesive base, a saturated hydrocarbon oligomer containing at least one acryloyl group in a molecule for affording crosslinkability by ultraviolet irradiation, and a photopolymerization initiator.

Another object of the present invention is to provide an optical discs comprising a pair of substrate, at least one of which is provided with an information recording layer, adhered to each other by means of a hot melt adhesive crosslinkable by ultraviolet irradiation.

A further object of the present invention is to provide a process for preparing an optical disc which comprises applying a hot melt adhesive crosslinkable by ultraviolet irradiation onto one of a pair of substrates, at least one of which is provided with an information recording layer, irradiating with ultraviolet radiation the hot melt adhesive applied, and then putting the other substrate onto the surface of said substrate applied with the hot melt adhesive. These and other objects and advantages of the present invention will be apparent to persons skilled in the art from the following description.

DETAILED DESCRIPTION OF THE INVENTION

Figure 1:
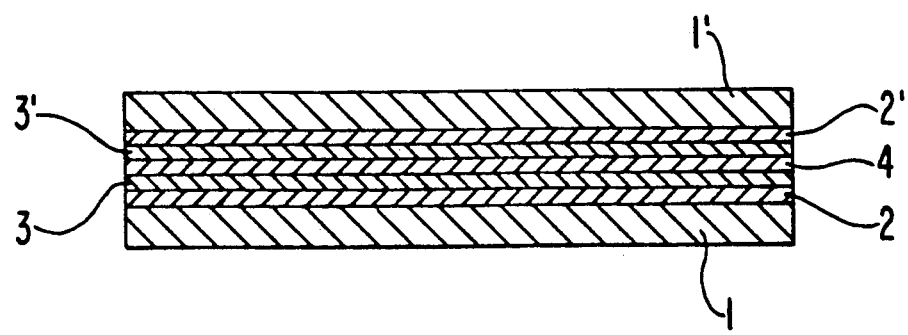
FIG. 1 illustrates a cross-sectional view of embodiment of the optical disc of the present invention.
1,1':a substrate
2,2':an information recording layer
3,3':a protecting film
4:an adhesive

The HMA crosslinkable by UV irradiation useful for preparing the optical disc of the present invention comprises an HMA base, a saturated hydrocarbon oligomer having at least one acryloyl group in a molecule for affording crosslinkability and a photopolymerization initiator as an essential component, which may optionally be incorporated with the conventional filler, antioxidant, polymerization inhibitor and the like, but it does not contain any radical polymerizing monomer which may induce corrosion of the substrate or increased viscosity and gellation of the HMA through thermal polymerization.

The HMA base used in the present invention has tackiness at room temperature and comprises one or two of a block thermoplastic elastomer represented by the formula:

A - B, A - B - A or B - A - B wherein A is a polystyrene block having a molecular weight of 2,000 to 12,500 and B is a polybutadiene block, polyisoprene block or ethylene-butylene copolymer block, which has a molecular weight of 1,000 to 250,000. The HMA base may optionally be incorporated with a synthetic rubber (e.g. polyisoprene, styrene rubber, butadiene rubber, butyl rubber, etc.), a polyolefin or polyolefin copolymer (e.g. polyethylene, polypropylene, ethylene-vinyl acetate copolymer, etc.), and further with a tackifier (e.g. rosin resin, hydrogenated petroleum resin, hydrogenated terpene resin, phenol resin, coumarone resin, etc.), a softening agent (e.g. process oil, paraffin oil, polybutene, polyisobutylene, etc.) in a suitable amount. The hydrogenated tackifier has an excellent compatibility, without any adverse effect against heat resistance and further a good corrosion resistance because of the low water absorption.

The saturated hydrocarbon resin oligomer having at least one acryloyl group in a molecule for affording cross-linkability by UV irradiation employed in the present invention includes an acrylate, urethane acrylate, epoxy acrylate or ester acrylate of a saturated hydrocarbon oligomer having at least one hydroxy group or carboxy group in a molecule (e.g. hydrogenate polybutadiene, polybutene, hydrogenated polyisoprene, polyisobutylene, etc.). These oligomers may be used alone or in combination of two or more thereof. The used amount of the oligomer is in a range of 5 to 100 parts (parts by weight, hereinafter the same), preferably 10 to 40 parts per 100 parts of the HMA base. When the amount is less than 5 parts, improvement of heat resistance is not sufficiently achieved by UV irradiation, and when the amount is more than 100 parts, the obtained adhesive tends to have decreased tackiness.

The photopolymerization initiator used in the present invention may be a conventional one which can produce radicals by UV irradiation, including, for example, a benzoin ether initiator (e.g. benzoin isopropyl ether, benzoin isobutyl ether, etc.), a benzophenone initiator (e.g. benzophenone, p-methoxybenzophenone, p-bromobenzophenone, etc.), an acetophenone initiator (benzilmethylketal, 2,2-diethoxyacetophenone, 1,1-diethoxyacetophenone, etc.), a thioxanthone initiator (e.g. 2-chlorothioxanthone, etc.) and the like. The initiator is usually used in an amount ranging from 0.5 to 5 weight % based on a total amount of the HMA base and the UV-crosslinkable saturated hydrocarbon oligomer.

The HMA crosslinkable by UV irradiation of the present invention comprises the HMA base, the UV-cross-linkable saturated hydrocarbon oligomer and the photopolymerization initiator in a fixed amount, and optionally the conventional filler, antioxidant, polymerization inhibitor and the like being added. The HMA crosslinkable by UV irradiation of the present invention is melted at a temperature of 80° to 160° C. The melt viscosity of the HMA is usually in a range of 5,000 to 500,000 cps at 120° C.

The HMA of the present invention may be used in the following manner. That is, the HMA of the present invention is first melted, the melted composition is applied onto a surface of substrates such as optical substrates in a thickness of 10 to 50 μm, UV is irradiated to the applied surface, and the substrates are piled with each other and then pressed at a pressure of 0.2 to 20 Kg/cm². Alternatively, after the melted composition is applied, the substrates are piled on with each other, pressed, and then UV radiation is irradiated to the substrates.

In accordance with the present invention, the heat resistance of the conventional HMA can be improved. The hot melt adhesive of the present invention is advantageous in that it is applicable at a low temperature and at a low viscosity, and that UV irradiation provides the HMA with a high softening point and a high viscosity, thereby increasing heat resistance as well as humidity resistance and weather resistance without impairment of disc. Further, since the adhesive of the present invention does not contain conventional acrylate monomer which induces thermal polymerization, an excellent heat stability can be attained when used and a pot life is also prolonged. The adhesive of the present invention is also free from corrosion of disc substrate made of plastics.

The optical disc of the present invention can be prepared by using as an adhesive the above HMA crosslinkable by UV irradiation of the present invention, the melt viscosity of which is usually in a range of from 5,000 to 500,000 cps at 120° C., and then irradiating UV. The optical disc of the present invention is explained by means of the accompanying figure.

FIG. 1 illustrates the optical disc of the present invention, comprising a base material (1 to 3) which comprises a substrate (1) such as an acryl plate, a polycarbonate plate, an amorphous polyolefin plate or a glass plate, an optically readable information recording layer (2) placed on said substrate (1), and optionally a protecting film (3) placed on said information recording layer (2). The HMA crosslinkable by UV irradiation (4) melted usually at 80° to 160° C. is applied onto the base material in a thickness of 10 to 50 μm, UV is then irradiated for about 2 to 20 seconds, followed by piling the resulting base material with another base material (1' to 3'), and they are pressed at a pressure of 0.2 to 20 Kg/cm² to give the optical disc of the present invention. The optical disc of the present invention may optionally omit one of the information recording layers (2, 2') and one or both of the protecting films (3,3') as in the conventional optical disc.

The present invention is illustrated by the following Examples and Comparative Examples but should not be construed to be limited thereto.

| Example 1 | |
|---|---|
| Component | Part by weight |
| Polystyrene-ethylene/butylene copolymer block thermoplastic elastomer (manufactured by Shell Chemical Co., Ltd. Califlex GX-1726) | 20 |
| Hydrogenated polybutadiene oligomer containing acryloyl group at its termini (urethane acrylate type) (manufactured by Nippon Soda Co., Ltd., TEAI-3000) | 25 |
| Hydrogenated styrene tackifier (manufactured by Rika Herculace Co., Ltd., Rigalets 1094) | 40 |
| Polyisobutylene (manufactured by Nippon Petroleum Co., Ltd., Tetrax 3T) | 10 |
| Benzil dimethyl ketal (manufactured by Nippon Ciba Geigy Co., Ltd., Irgacure 651) | 3 |

The above components are mixed all together to give HMA crosslinkable by UV irradiation, which has a melt viscosity of 70,000 cps at 120° C.

COMPARATIVE EXAMPLE 1

The procedure of Example 1 is repeated except that the same amount of polybutadiene oligomer having acryloyl group at its termini (manufactured by Idemitsu Petrochemical Co., Ltd., Poly bd R-45ACR-LC) is employed in place of the hydrogenated polybutadiene oligomer having acryloyl group at its termini (urethane acrylate type) to give an adhesive.

COMPARATIVE EXAMPLE 2

The procedure of Example 1 is repeated except that 20 parts of trimethylolpropane triacrylate is employed in place of the hydrogenated polybutadiene oligomer having acryloyl group at its termini to give an adhesive.

EXPERIMENT (1) Heat resistance:

After each adhesive is melted at 120° C., the melted adhesive is left to stand for 24 hours and then observed for a change in conditions. The results are shown in Table 1.

(2) Heat creep resistance:

Onto two acrylic plates (25×60×1.5 mm) is applied each adhesive melted at 120° C. in a thickness of 30 μm and thereto UV is irradiated at 460 mJ/cm$^2$, immediately piling them up with lapping in 20 mm, and pressing at a pressure of 10 Kg/cm$^2$. The obtained laminated plate is subjected to heat creep resistance test (load: 200 g, measuring vertically falling time) under nitrogen atmosphere. The results are shown in Table 1.

TABLE 1

| | Ex. 1 | Comparative Example | | |
|---|---|---|---|---|
| | | 1 | 2 | 3* |
| Heat resistance | Normal | Gellation | Gellation | Normal |
| Heat creep resistance (falling time) | >24 hr. | >24 hr. | >24 hr. | <1 min. |

(Note)
*Commercially available HMA is employed

As shown in the above Table 1, the adhesive of the present invention has an excellent property both in heat stability and heat creep resistance.

EXAMPLE 2

Onto one of a pair of base materials, which are prepared by depositing aluminum onto injection-molded acrylic substrates of 30 cm diameter having a pit information recording layer and then coating thereon with a protecting film of ethylene-vinyl acetate copolymer, is applied the HMA crosslinkable by UV irradiation prepared in Example 1 with a hot melt coater in a thickness of 30 μm at 120° C. Thereto is irradiated UV at 0.9 W.S/cm$^2$ at a distance of 10 cm by means of a high-pressure mercury lamp (80 W/cm) and then both base materials are piled up (laminated) together with a pressure of 10 Kg/cm$^2$ to give an optical disc.

COMPARATIVE EXAMPLE 4

The procedure of Example 2 is repeated except that the HMA prepared from the following components is employed and after the HMA is applied to, the base materials are immediately piled up together without irradiating UV to give an optical disc.

| Components | Part by weight |
|---|---|
| SIS rubber (manufactured by Shell Chemical Co., Ltd., Califlex TR-1107) | 30 |
| Tackifier (manufactured by Yasuhara Yushi Industries Co., Ltd., Cliaron P105) | 50 |
| Oil (manufactured by Shell Chemical Co., Ltd., Shelflex 371N) | 20 |
| Antioxidant (manufactured by Nippon Ciba Geigy Co., Ltd., Iruganox 1010) | 2 |

COMPARATIVE EXAMPLE 5

The procedure of Example 2 is repeated except that two-pack type curable epoxy adhesive is employed and after application the base materials are piled up together with a pressure of 2 Kg/cm$^2$ which is then left to stand at room temperature for 24 hours to give an optical disc.

The above optical discs prepared in Example 2 and Comparative Examples 4 and 5 are evaluated for their property as shown in the following Table 2.

TABLE 2

| | Ex. 2 | Comp. Ex. 4 | Comp. Ex. 5 |
|---|---|---|---|
| Time required for completion of optical disc from application of adhesive (time for adhesion) | 2-3 min. | 1-2 min. | 24 hr. |
| Heat resistance (70° C. × 500 hr.) | Normal | Melting adhesive | Normal |
| Humidity resistance (60° C./85% R.H.) (× 500 hr.) | Normal | Peeled disc | Normal |

What is claimed is:

1. A hot melt adhesive crosslinkable by ultraviolet irradiation comprising:
   (i) a hot melt adhesive base which comprises:
      (a) one or two of a block thermoplastic elastomer represented by the formula:

A - B, A - B - A or B - A - B wherein A is a polystyrene block having a molecular weight of 2,000 to 12,500 and B is selected from the group consisting of a polybutadiene block, a polyisoprene block and an ethylene-butylene copolymer block each of which has a molecular weight of 1,000 to 250,000,
      (b) a tackifier, and
      (c) a softening agent;
   (ii) an acrylate of a saturated hydrocarbon oligomer containing at least one hydroxy group or carboxy group in a molecule for affording crosslinkability by ultraviolet irradiation, wherein said saturated hydrocarbon oligomer is selected form the group consisting of hydrogenated polybutadiene, polybutene, hydrogenated polyisoprene and polyisobutylene; and
   (iii) a photopolymerization initiator.

2. The hot melt adhesive crosslinkable by ultraviolet irradiation of claim 1 wherein said acrylate is selected from the group consisting of a urethane acrylate, an epoxy acrylate and an ester acrylate.

3. The hot melt adhesive crosslinkable by ultraviolet irradiation of claim 1 wherein 5 to 100 parts by weight of the acrylate for affording crosslinkability by ultraviolet irradiation is employed per 100 parts by weight of the hot melt adhesive base, and 0.5 to 5 weight % of the photopolymerization initiator is employed based on a total amount of the hot melt adhesive base and the acrylate for affording crosslinkability by ultraviolet irradiation.

4. The hot melt adhesive crosslinkable by ultraviolet irradiation of claim 3, wherein 10 to 40 parts by weight of the acrylate for affording crosslinkability is employed per 100 parts of the hot melt adhesive base.

* * * * *